(12) United States Patent
Gan et al.

(10) Patent No.: US 8,729,159 B2
(45) Date of Patent: May 20, 2014

(54) FIBREBOARD FROM AGRICULTURAL WASTES AND A METHOD FOR MANUFACTURING THE SAME

(75) Inventors: Seng Neon Gan, Kuala Lumpur (MY); Soon Chee Yap, Selangor (MY); Chin Shia Chang, Selangor (MY)

(73) Assignees: Universiti Malaya, Kuala Lumpur (MY); Emery Oleochemicals (M) Sdn. Bhd., Selangor (MY)

( * ) Notice: Subject to any disclaimer, the term of this patent is extended or adjusted under 35 U.S.C. 154(b) by 118 days.

(21) Appl. No.: 13/511,235

(22) PCT Filed: Nov. 10, 2010

(86) PCT No.: PCT/MY2010/000267
§ 371 (c)(1),
(2), (4) Date: Jul. 31, 2012

(87) PCT Pub. No.: WO2011/062472
PCT Pub. Date: May 26, 2011

(65) Prior Publication Data
US 2012/0296014 A1    Nov. 22, 2012

(30) Foreign Application Priority Data

Nov. 23, 2009  (MY) ............................... PI 20094949

(51) Int. Cl.
*C08L 97/02* (2006.01)
*B29C 47/00* (2006.01)

(52) U.S. Cl.
USPC .................................. 524/9; 524/13

(58) Field of Classification Search
CPC ........................................ C08L 97/02
USPC ............................................ 524/9
See application file for complete search history.

(56) References Cited

U.S. PATENT DOCUMENTS

| | | | |
|---|---|---|---|
| 4,609,513 A * | 9/1986 | Israel | 264/122 |
| 6,121,398 A | 9/2000 | Wool et al. | |
| 6,287,495 B1 | 9/2001 | Rosthauser | |
| 6,368,714 B1 | 4/2002 | Robertson et al. | |
| 2011/0073253 A1* | 3/2011 | Clausi et al. | 156/296 |

FOREIGN PATENT DOCUMENTS

| | | |
|---|---|---|
| WO | 2010006409 | 1/2010 |
| WO | 2010102284 | 9/2010 |

* cited by examiner

*Primary Examiner* — Hui Chin
(74) *Attorney, Agent, or Firm* — Preston Smirman; Smirman IP Law, PLLC

(57) ABSTRACT

A fiberboard comprising dried plant fibers added with binder resins obtained from a reaction between a diisocyanate and a polyol derived from natural oils or fatty acids, and formed by pressing at a temperature range of 50° C. to 150° C.

17 Claims, 2 Drawing Sheets

FIBREBOARD FROM AGRICULTURAL WASTES AND A METHOD FOR MANUFACTURING THE SAME

CROSS-REFERENCE TO RELATED APPLICATION

The instant application is a national phase of PCT/MY2010/000267, filed Nov. 10, 2010, pending, which claims priority to Malaysian Patent Application No. PI 20094949, filed Nov. 23, 2009, pending, the entire specifications of both of which are expressly incorporated herein by reference.

FIELD OF INVENTION

The present invention relates generally to a fibreboard made from agricultural wastes and a method for manufacturing the same. In more particular, the present invention provide an environmentally friendly fibreboard which uses polyurethane oligomers derived from natural oils as the binder resins. This fibreboard can be manufactured by a method which requires low to moderate temperature and moderate pressure. It is useful for various construction applications as well as in furniture industry.

BACKGROUND OF THE INVENTION

Fibreboard is a type of composite wood panel made from lignocellulosic fibres, combined with a resin or other suitable binder, and then bonded together under heat and pressure. Fibreboards are classified by density, for example a fibreboard with density between 500 $kgm^{-3}$ and 800 $kgm^{-3}$ is classified as medium density fibreboard (MDF) and a fibreboard with specific gravity greater than 800 $kgm^{-3}$ is classified as high density fibreboard (HDF).

Fibreboards are manufactured primarily for use as panels, insulation and cover materials in buildings and construction where flat sheets of moderate strength are required. They have frequently taken the place of solid wood, plywood, and particleboard for many furniture applications. They are also used to a considerable extent as components in doors, cabinets and cupboards. The potential use of fibreboard in other interior and exterior markets such as mouldings, exterior trim and pallet decking has been explored by the industry and the market is fast expanding.

Fibreboards are manufactured via a multi-step process. Typically, wood chips or other suitable materials are softened and lignin is broken down. The treated chips are then separated into their component fibres, and the hot, wet fibres are rapidly transported via steam through a blowline in which the binders are added to the fibres via blowline injection. The blowline deposits the binder-treated fibres into a dryer, and eventually into forming and pressing devices which produce the final panels. Ideally, polymerization of the binder into its final thermoset form takes place in the hot press, not prior to pressing the fibreboards into their final form. To avoid the problem of binder sticking on the press platens, a low dosage of wax emulsion has to be added together into the binders.

Traditional binder resins used in the manufacture of fibreboards include thermosetting binders, especially formaldehyde-based binders, such as urea formaldehyde and melamine formaldehyde. The binder content could range from 10% to 20% of total finished fibreboards weight. Isocyanate-based binders, particularly methyl diphenyl diisocyanate (MDI) binders, have some significant advantages over formaldehyde-based binders, including superior physical and moisture-resistance properties as well as the ability to eliminating formaldehyde emission hazards. Although isocyanate-based binder technology for fibreboard manufacture has been available for many years, this binder, however, has not gained widespread commercial acceptance, primarily because of its cost, coupled with difficulties countered in process design.

The use of isocyanate-based binders via blowline injection also poses different drawbacks. This is due to the fact that isocyanates react very quickly with water to form polyureas at elevated temperatures, such as the temperatures experienced in the blowline. It may cause a great deal of isocyanate being converted to polyureas prior to pressing, that can lead to the formation of solids, which foul the blowline or the dryer. Besides, pre-polymerization renders a significant portion of the binder non-effective, greatly reducing bonding efficiency. Isocyanate is also volatile and may be lost in the drying process at high temperatures.

In order to protect isocyanate-based binders from the harsh conditions of the typical fibreboards manufacturing process, emulsified isocyanates have been developed. These modified isocyanates can be mixed with water using an in-line static mixer, and subsequently injected into the blowline. Emulsification prevents the build up of isocyanate-water reaction products on the walls of the blowline and helps to prevent premature reaction of the binder. Emulsification also helps to increase the volume of liquid being dispensed, which helps to achieve a more even distribution of binder throughout the fibres. Unfortunately, converting an isocyanate to the emulsified form entails additional manufacturing costs, which make these products less cost effective. In addition, the presence of emulsifying agents could also affect the properties of the boards, as it is well known that many surfactants used as emulsifying agents could absorb moisture and reduce the bonding strength of the binder resins.

Another cost-disadvantage of isocyanate binders is their need for a release agent, in order to avoid sticking to metal press platens. In industrial practice, water-based release agents are typically emulsified in line with the emulsifiable MDI just prior to blowline injection.

All of the technologies set forth in the preceding description are well-known. For example, the process for using isocyanate binders for the production of fibreboards via blowline injection is described in U.S. Pat. No. 4,407,771 issued to the Celotex Corporation in 1983. An example of the use of emulsified isocyanate binders is described in U.S. Pat. No. 3,996, 154 issued to ICI Americas Inc. in 1976. The use of wax release agents in conjunction with isocyanate binders is described in U.S. Pat. No. 4,388,138 and U.S. Pat. No. 4,396, 673, both issued to ICI Americas Inc. in 1983. In addition, the use of an in-line mixing apparatus for dispensing isocyanate binders into the blowline of a manufacturing process is described in, for example, U.S. Pat. No. 5,093,058 issued to the Medite Corporation in 1992.

Various types of fibreboard based on natural materials and methods for manufacturing thereof have been disclosed in the prior arts. Japanese Patent No. 2002283313 relates to a method for manufacturing fibreboard in which raw fibre was obtained from kenaf, oil palm or coconut. However, the binder resins used are water-soluble phenol adhesives. Another Japanese Patent No. 11264212 also relates to a fibreboard made from palm fibre. Similarly, the curing resin used includes phenolic resins. Another type of binder is the amino resin deriving from the reactions of urea or melamine with formaldehyde as disclosed in Japanese Patent No. 11198110. All these patented technologies only use natural fibres as the raw materials but not natural oil-based binder.

Despite all of these known technologies, the use of isocyanates in fibreboard manufacture had remained unpopular, because of the limitations of the aforementioned cost effectiveness and related application problems. As the isocyanates offer significant advantages in product properties over other technologies to be used as binder in the manufacture of fibreboards, it is therefore desirable for the present invention to apply an innovated type of isocyanate-based binder in the manufacture of fibreboard. The natural oil-based binder can be obtained from an improved method using more cost effective materials, such as environmentally friendly natural materials.

SUMMARY OF INVENTION

The primary object of the present invention is to provide an environmentally friendly fibreboard made of agricultural wastes which uses natural-oil based polyurethane oligomers as binder resins.

Another object of the present invention is to develop a fibreboard with a binder comprising a polymeric MDI oligomers having relatively low diisocyanate content which provides more advantages than the existing types of binder, such as the ability of eliminating formaldehyde emission hazards and the property of being moisture-resistance.

Still another object of the present invention is to provide a method for manufacturing fibreboard using binder resins derived from natural oils which is environmentally friendly.

Yet another object of the present invention is to provide a fibreboard which requires a manufacturing process which is simple and low in cost.

Further object of the present invention is to optimize the use of natural products, such as palm oil-derived materials as raw material for the manufacture of a useful product which creates another avenue for commercialization of this natural product.

At least one of the preceding objects is met, in whole or in part, by the present invention, in which one of the embodiments of the present invention describes a fibreboard comprising dried plant fibres added with binder resins obtained from a reaction between a diisocyanate and a polyol derived from natural oils, and formed by pressing at a temperature range of 50° C. to 150° C.

One of the preferred embodiments of the present invention discloses that the plant fibres are derived from agricultural wastes.

Preferably, the diisocyanate is methyl diphenyl diisocyanate (MDI), toluene diisocyanate (TDI), hexamethylene diisocyanate (HDI), isophorone diisocyanate (IPDI) and any combination thereof.

Still another preferred embodiment of the present invention discloses that the polyol is derived from palm oil, coconut oil, soy oil, jatropa oil, linseed oil, castor oil, rapeseed oil, tallow oil, fish oil or a combination of any two or more thereof. The free fatty acids from these oils can also be used.

Further embodiment of the present invention is a method for manufacturing a fibreboard comprising the steps of mixing dried plant fibres with binder resins obtained from a reaction between a diisocyanate and a polyol derived from natural oils; and pressing the mixture at a temperature range of 50° C. to 150° C. to form the fibreboard.

Another preferred embodiment of the present invention discloses a method as embodied herein which further comprises a step of refining the plant fibres before they are dried.

Still another preferred embodiment of the present invention discloses that the dried plant fibres are having a moisture content of less than 10%, more preferably less than 5%, and most preferably less than 2% by weight.

In yet another preferred embodiment of the present invention, the dried plant fibres are mixed with the binder resins by mechanical agitation.

Preferably, the fibreboard formed can be further moulded into various shapes depending on their applications.

One skilled in the art will readily appreciate that the present invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

Figure 1:
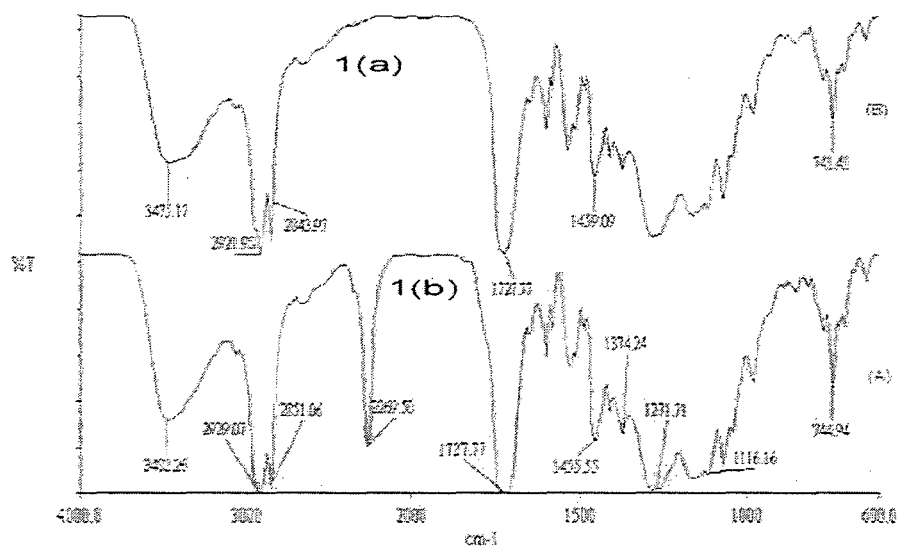
FIG. 1 is a Fourier Transform Infrared (FTIIR) spectra of (a) polyol P1 and (b) polyurethane binder with —NCO terminals, as described by one of the preferred embodiments of the present invention.

The present invention relates generally to a fibreboard made from agricultural wastes and a method for manufacturing the same. In more particular, the present invention provide an environmentally friendly fibreboard which uses polyurethane oligomers derived from natural oils as the binder resins. This fibreboard can be manufactured by a method which requires low to moderate temperature and moderate pressure. It is useful for various construction applications as well as in furniture industry.

Hereinafter, the invention shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

The present invention discloses a fibreboard comprising dried plant fibres added with binder resins obtained from a reaction between a diisocyanate and a polyol derived from natural oils, and formed by pressing at a temperature range of 50° C. to 150° C.

The present invention is characterized by the use of natural fibres as well as environmentally friendly binder resins. Preferably, the natural plant fibres are derived from agricultural wastes, including various woody or herbaceous cellulosic fibres, for instance, palm fibres, wood pulp, fibres derived from kenaf, roselle, flax, jute or hemp, leaf fibres such as sisal hemp or manila hemp, stems of various other plants, saw dust or others.

Among the fibres as set forth in the preceding description, the fibres derived from the palm oil industry are most preferred to be used as the raw materials for the present invention. Fibres from oil palm wastes are considered waste materials that could post environment pollution problems if they are not properly disposed off. The major bulk of palm fibres come from the empty fruit branches (EFB). The production of EFB is estimated to be around 3 million tons annually. Other waste fibres generated from the palm oil industry are the extracted seeds, oil palm fronds (OPF) and oil palm trunks (OPT).

According to the preferred embodiment of the present invention, the environmentally friendly binder resins are obtained from the reaction between a diisocyanate and natural oil-based polyols. These polyols can be derived from palm oil, coconut oil, soy oil, jatropa oil, linseed oil, castor oil, rapeseed oil, tallow oil, fish oil or a combination of any two or more thereof. These polyols can also be derived from the free fatty acids of palm oil, coconut oil, soy oil, jatropa oil, linseed oil, castor oil, rapeseed oil, tallow oil or fish oil. These polyols can also be made from the free fatty acids of the abovementioned natural oils and they include fatty acids such as oleic acid, stearic acid, lauric acid, palmitic acid, myristic acid, linolenic acid, linoleic acid and caprylic acid.

Still another preferred embodiment of the present invention discloses that the diisocyanate used in the present invention can be methylene diphenyl diisocyanate (also known as diphenylmethane diisocyanate) (MDI), toluene diisocyanate (TDI), hexamethylene diisocyanate (HDI), isophorone diisocyanate (IPDI) and any combination thereof. Most preferably, MDI is employed in the present invention. The preferred choice of polymeric MDI would be one with low viscosity, preferably less than 300 cps, so that the polyurethane oligomers would still be a flowable liquid after the reaction with the polyol.

Commercially available polymeric MDI generally contains 27% to 40% of the isocyanate terminals (—NCO). Examples of such commercially available polymeric MDI include Desmodur VKS10, available from Bayer, SUPRASEC® 2085 from Huntsman and Wannate PM-2025 from Yantai Wanhua Polyurethanes Co. Ltd. In accordance with the preferred embodiment of the present invention, a polymeric MDI having relatively low diisocyanate content is employed in the fibreboard manufacturing process. This can be achieved by partially reacting the MDI with calculated amount of a natural oil-based polyol. The reaction would generate a mixture of polyurethane oligomers with isocyanate terminals —NCO. Preferably, the polyurethane oligomer obtained is having a diisocyanate content of less than 25% by weight. Most preferably, the polyurethane oligomer employed in the present invention shall possess a diisocyanate content of about 15% by weight.

Besides the utilization of naturally-derived plant fibres as the raw materials, the natural oil-based polyurethane oligomer resins made of high proportion of natural materials are also used as the binder of the natural fibres. The binder resins obtained do not require petroleum solvent in its manufacturing process. Therefore, when all stages of producing, use and final disposal of fibreboards are considered, it is possible to reduce the load on the environment.

Moreover, the resin requires relatively low setting temperature of 50° C. to 150° C., more preferably between 80° C. to 120° C. This would enable the use of cheap plastic sheets such as polyethylene and polypropylene to line the press platens, without the need of any mould release agent. Besides, the present invention also allows the incorporation of additives such as flame retardant, antistatic agent, antioxidant or filler into the resins without affecting the property of the resin. The properties of the final fibreboards manufactured, such as improved fire rating, antistatic performance and better hardness can therefore be enhanced.

Further embodiment of the present invention is a method for manufacturing a fibreboard comprising the steps of mixing dried plant fibres with binder resins obtained from a reaction between a diisocyanate and a polyol derived from natural oils or free fatty acids; and pressing the mixture at a temperature range of 50° C. to 150° C. to form the fibreboard.

As set forth in the preceding description, the present invention broadly relates to a method for manufacturing a fibreboard, particularly medium density fibreboards. Initially, the raw fibre materials are screened to remove therefrom both oversized and undersized particles. The materials can be subjected to a preliminary washing step if deemed necessary. The cleaned materials are conveyed to storage bins that feed them to a pressurized digester-refiner system, which can be of a conventional design. Subsequently, the raw fibres are shredded into fine fibres in the refiner and then blown through an orifice which is the blow valve, out of the refiner to the blowline. The fibres emerged from the refiner into the blowline are, generally, having a moisture content of 50% or higher based on the total solids weight, and a temperature of at least about 100° C. to 200° C. After refining, the stock and steam are conveyed through the blowline to a flash tube dryer, where the fibre moisture content is reduced to less than 10%, more preferably less than 5%, and most preferably less than 2%. by weight. The dried fibres can be sent into a mixing tank at normal factory conditions, the temperature of fibres could be around 50° C. from the previous operation.

The binder resin consists of a mixture of low isocyanate-containing polyurethane oligomers, can be introduced into the mixing tank. The quantity of the binders needed in a particular application can be determined by simple experimentation. Preferably, an application of about 5% to 30%, most preferably 12% to 15% based on the oven-dry weight of the plant fibres is employed. The binder resins can be sprayed into the centre of the mass of plant fibres which is being mechanically agitated, in order to minimize the problem where the binder reaches the side of the mixing tank and the fibres being stuck onto the wall of the tank.

It is known in the art that the mixing of the fibres and binder resins can be carried out by various mechanical means. This mechanical means can be a spiraling blade stirrer or other engineering design in order to maximize the distribution of the binder throughout the fibres.

As set forth in the foregoing description, the preferred diisocyanate to be used in the binder resins is MDI. The polymeric MDI-containing binders can result in superior physical and mechanical properties in the resulting fibreboards. For example, these fibreboards will have higher internal bond strength and reduced edge swelling as compared to fibreboards produced with conventional urea-formaldehyde binders.

Preferably, the fibreboard of the present invention can be moulded so that the apparent density is 0.4 g cm$^{-3}$ to 1.4 g cm$^{-3}$, most preferably 0.5 g cm$^{-3}$ to 1.2 g cm$^{-3}$. By setting the apparent density to the range of 0.5 g cm$^{-3}$ to 1.2 g cm$^{-3}$, it is possible to achieve mechanical strengths which are required to be used for automobile interior materials, building materials and furniture industry. The apparent density is defined as:

$$\text{Weight of fibreboard(g)/Volume of fibreboard(cm}^3)$$

Moreover, in the case of the present invention, it is preferable that the natural oil-based polyols for reaction with polymeric MDI to have a hydroxyl value of between 100 mg KOH/g to 250 mg KOH/g and a functionality of 2.2 to 3.0. The preferred equivalent weights of the polyols are in the range of 225 to 560. The preferred equivalent amount of MDI to be mixed to generate the oligomer binder resins is in the range of 0.9 to 2.5, more preferably 1.2 to 2.0.

The present invention is not intended to limit the shape of the fibreboards to be flat. The fibreboards may include boards having patterns of convex or concave parts on a surface thereof and boards formed in shapes given by the press moulds. In the making of the fibreboards, the mechanical strength and properties are also dependent on many other parameters, some of which are inter-related. Some of the important parameters include the type of fibre, type of binder and relative amount of binder, press temperature, press pressure and press duration. The relationship between these parameters and the properties of the fibreboard manufactured is further described in the examples.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

EXAMPLE

Examples are provided below to illustrate different aspects and embodiments of the present invention. These examples are not intended in any way to limit the disclosed invention, which is limited only by the claims.

Example 1

Making of Palm Oil-Based Polyols and Polyurethane Binder Resins Thereof

A palm oil-based polyol was synthesized with the composition as tabulated in Table 1.

TABLE 1

| Polyol | P1 | P2 | P3 | P4 |
|---|---|---|---|---|
| Palm kernel oil/g | 880 | 0 | 0 | 0 |
| Oleic acid/g | 0 | 460 | 200 | 115 |
| Glycerol/g | 248 | 145 | 130 | 115 |
| Pthalic anhydride/g | 387 | 102 | 173 | 176 |
| OHV (mgKOH g$^{-1}$) | 107 ± 5 | 136 ± 7 | 132 ± 7 | 133 ± 7 |
| Equivalent weight | 520 ± 30 | 410 ± 20 | 420 ± 20 | 420 ± 20 |

As an illustration, the synthesis of polyol P1 is as follow. Initially, the required amount of palm kernel oil was weighed and poured into the reactor followed by glycerol. 0.5 g of potassium hydroxide dissolved in 5 ml water was added into the mixture as a catalyst. The mixture was then heated to 240° C. for approximately 2 hours. The mixture was allowed to cool down below 120° C. before the phthalic anhydride added. The mixture was heated slowly until 180° C. and held for 1 hour, subsequently the temperature was raised and held at 200-220° C., and water of reaction was collected in the side arm of the condenser. The progress of this reaction was monitored by the water of reaction until the amount was close to the calculated value of 48 g, then the heater was turned off. After the temperature has dropped to room temperature, the polyester polyol was packed into a container. Upon characterization, the polyol has a hydroxyl value of approximately 107 mgKOH/g and an equivalent weight of approximately 523 g. The hydroxyl number was determined according to the standard test method as described under ASTM D4274-94. The equivalent weight is determined from the following equation:

Equivalent weight=56100/$OHV$

Polyols P2, P3 and P4 are synthesized by a slightly modified procedure as follow. The mixture of oleic acid, phthalic anhydride and glycerol was heated slowly until 180° C. and held for 1 hour, subsequently the temperature was raised and held at 200-220° C., and water of reaction was collected in the side arm of the condenser. The progress of this reaction was monitored by the water of reaction until the amount was close to the calculated value, then the heater was turned off. After the temperature has dropped to room temperature, the polyester polyol was packed into a container.

Calculated amount of water=equivalent amount of acid used×8+moisture content of glycerol(if not completely dry)

The successful formation of polyol can be confirmed by FTIR measurement, where the hydroxyl group can be seen as a strong broad peak at around 3454 cm$^{-1}$ in the spectrum, as illustrated in FIG. 1 (*a*). To produce the polyurethane binder or the polyurethane oligomer preferably with small amount of isocyanate (—NCO) terminals, 523 g of the polyol was reacted with 140 g of polymeric MDI with equivalent weight of 133.3 g. The formation of the polyurethane binder can be confirmed by FTIR measurement, where the —NCO terminals could be seen as a weak peak at around 2270 cm$^{-1}$ in the spectrum, as illustrated in FIG. 1 (*b*).

Example 2

Effects of the Binder Content on the Density of the Board

Figure 2:
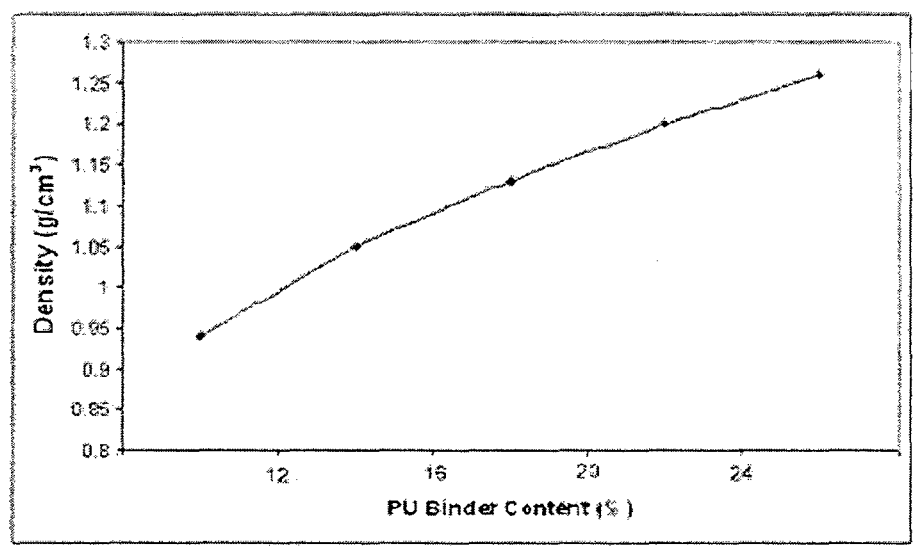
FIG. 2 show the effect of binder content on board density at fixed pressure of 7.0 MPa with the curing temperature of 100° C. for 15 mins, as described by one of the preferred embodiments of the present invention.

The present examples were based on boards made from palm fibres of the empty fruit branches. Within the range of binder content investigated, the density of the board increased with the resin content, and at a fixed pressure of 7.0 MPa, at a temperature of 100° C., for a duration of 15 minutes. All the resulting boards appeared good with smooth surface, and thickness of between 10 mm to 16 mm. The results are shown in FIG. 2.

Example 3

Effects of the Curing Time on the Tensile Strength of the Board

Figure 3:
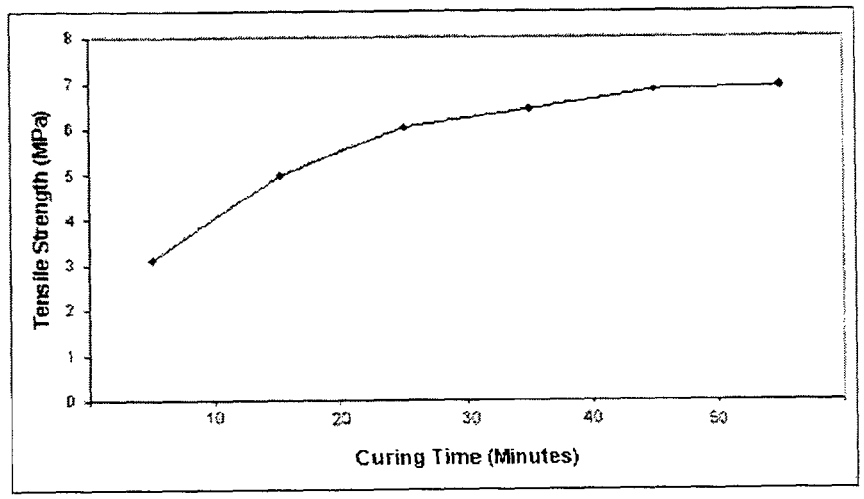
FIG. 3 shows the effect of the curing time on the tensile strength of the fibreboard made at 28% binder content and pressed at 7.0 MPa at 100° C., as described by one of the preferred embodiments of the present invention.

At a fixed binder content (20%), pressure of 7.0 MPa, and press temperature of 100° C., the tensile strength of the board increased with the pressing time. All the boards appeared good with smooth surface, and thickness of between 12 mm to 16 mm. Even within a short duration of 10 minutes, the tensile strength had achieved 4 MPa, and had increased quite rapidly between 10 min to 25 min. After that, the increase became gradually slower, reaching a maximum at around 50 minutes. The results are summarized in FIG. 3.

Example 4

Figure 4:
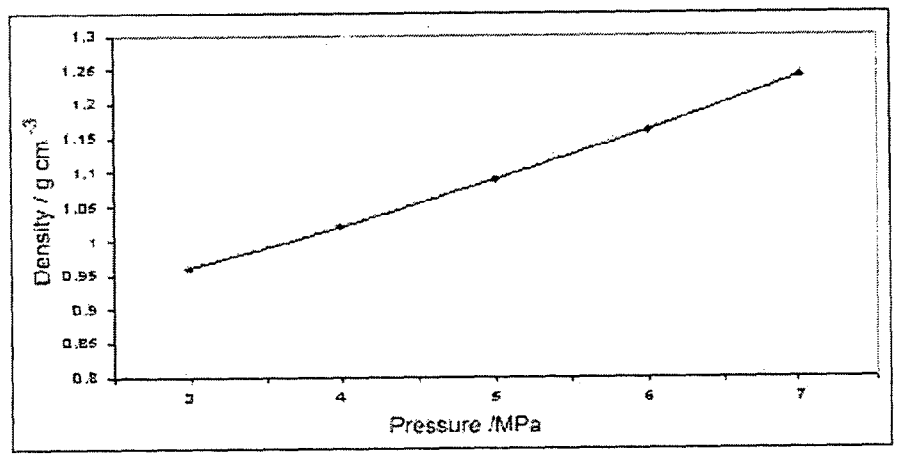
FIG. 4 shows the effect of the curing pressure on the density of the fibreboards made with 30% binder, cured at 100° C. for 25 minutes, as described by one of the preferred embodiments of the present invention.

Effects of the Curing Pressure on the Density of the Fibreboards Made with 30% Binder and Cured at 100° C. for 25 Minutes At a fixed binder content and curing temperature, the density of the board increased with pressure. All the boards appeared good with smooth surface, and thickness of between 12 mm to 16 mm. The results were summarized in FIG. 4.

Table 2 shows the results of four sets of boards made from palm fibres of the empty fruit branches (EFB) being compared with commercial fibreboard (made from EFB) produced with urea-formaldehyde resin. The physical and mechanical properties were in accordance with ASTM D-1037. The thickness swell and internal bond strength were measured in accordance with ASTM D-1037.

TABLE 2

| BOARD | A | B | C | D | UF* |
|---|---|---|---|---|---|
| Ratio of Polyol:MDI | 3:2 | 1:1 | 3:2 | 1:1 | — |
| Board composition (%) | | | | | |
| Palm Fibre:Binder | 9:1 | 9:1 | 5.6:1 | 9:1 | — |
| Press Setting | | | | | |
| Temperature (° C.) | 80 | 80 | 120 | 120 | — |
| Pressure (Tonnage) | 40 | 40 | 25 | 25 | — |
| Holding time (min) | 15 | 15 | 15 | 0 | — |
| ANALYSIS Mechanical strength | | | | | |
| Size thickness (mm) | 11.9 | 12.1 | 10.6 | 11.8 | 11.4 |
| Density (kg/m$^3$) | 750 | 766 | 760 | 683 | 780 |
| Modulus of Rapture (N/mm$^2$) | 8.28 | 10.6 | 15.8 | 18.53 | 10.4 |
| Modulus of Elasticity (N/mm$^2$) | 1037 | 1225 | 1268 | 1641 | 1250 |
| Internal Bonding (N/mm$^2$) | 0.7 | 0.6 | 1.3 | 1.2 | 0.6 |
| Swelling test | | | | | |
| Water immersion Thickness Swelling 24 Hrs (%) | 28.2 | 21.4 | 18.8 | 12.5 | 30.5 |

*UF: a commercial palm fibreboard made with urea-formaldehyde resin, at high pressure and temperature (270° C.).

The data clearly shows that fibreboards produced in accordance with the present invention resulted in superior properties when compared to the commercial fibreboards produced with conventional urea-formaldehyde resin. The differences in properties between boards A, B, C and D were due to the variation in the production parameters such as temperature, ratio of fibre to resin and pressure. This serves to demonstrate that one skill in the arts would be able to control such parameters to produce different grades of the boards, suited for specific end uses.

TABLE 3

| BOARDS | I | II | III | IV | CRWB* |
|---|---|---|---|---|---|
| Ratio of Polyol:MDI | 3:2 | 3:2 | 3:2 | 1:1 | — |
| Rubberwood Fibre/parts | 80 | 80 | 90 | 90 | — |
| Binder/parts | 20 | 20 | 10 | 10 | — |
| Press Setting | | | | | |
| Temperature (° C.) | 100 | 100 | 100 | 100 | — |
| Pressure (Tonnage) | 50 | 40 | 40 | 40 | — |
| Holding time (min) | 15 | 15 | 15 | 15 | — |
| ANALYSIS Mechanical strength | | | | | |
| Size thickness (mm) | 12.5 | 10.6 | 12.5 | 12.2 | 12.3 |
| Density (kg/m$^3$) | 885.9 | 877.1 | 760.9 | 771.9 | 825.0 |
| Bending Strength (N/mm$^2$) | 31.3 | 22.6 | 13.5 | 19.5 | 26.0 |
| Modulus of Elasticity (N/mm$^2$) | 3038 | 2387 | 2432 | 2610 | 2500 |
| Internal Bonding (N/mm$^2$) | 3.5 | 2.2 | 0.7 | 1.4 | 1.2 |
| Swelling test (immersion in water) | | | | | |
| Swelling after 24 Hrs Thickness % | −13.4 | −13.3 | −10.5 | −11.2 | 13.0 |

*CRWB: a commercial rubber wood fibreboard.

As shown in Table 3 are the results of four sets of boards made from rubber wood fibres being compared with commercial exterior grade fibreboard produced with phenol-formaldehyde resin. It should be pointed out that the commercial sample (CRWB) was produced at much higher press temperature (typically >200° C.), and wax was incorporated in the binder in order to achieve better resistance against water swelling.

The test fibreboards were comparable to the commercial exterior grade of fibreboard.

It should be pointed out that the comparable water resistance properties of the test fibreboards were achieved without having to incorporate any wax in the formulation. Specific properties could be further enhanced through the adjustment of the production parameters.

The invention claimed is:

1. A fiberboard, comprising:
   dried plant fibers derived from agricultural wastes; and
   binder resins of polyurethane oligomers obtained from a reaction between a diisocyanate and a polyol derived solely from natural oils;
   wherein the fiberboard is formed by pressing in a mold at a temperature range of 50° C. to 120° C.;
   wherein the diisocyanate content is less than 25% by weight of the polyurethane oligomers.

2. The fiberboard according to claim 1, wherein the plant fibers are derived from palm wastes.

3. The fiberboard according to claim 1, wherein the diisocyanate is selected from the group consisting of methyl diphenyl diisocyanate (MDI), toluene diisocyanate (TDI), hexamethylene diisocyanate (HDI), isophorone diisocyanate (IPDI) and combinations thereof.

4. The fiberboard according to claim 1, wherein the natural oils are selected from the group consisting of palm oil, coconut oil, soy oil, jatropa oil, linseed oil, castor oil, rapeseed oil, tallow oil, fish oil and combinations thereof.

5. The fiberboard according to claim 1, wherein the fiberboard is formed by pressing in a mold at a temperature range of 80° C. to 120° C.

6. The fiberboard according to claim 1, wherein the fiberboard is formed by pressing in a mold at a temperature range of 80° C. to 100° C.

7. The fiberboard according to claim 1, wherein the fiberboard is formed by pressing in a mold at a temperature range of 50° C. to 100° C.

8. The fiberboard according to claim 1, wherein the diisocyanate content is about 15% by weight of the polyurethane oligomers.

9. A fiberboard, comprising:

dried plant fibers derived from palm wastes; and binder resins of polyurethane oligomers obtained from a reaction between a diisocyanate and a polyol derived solely from natural oils;

wherein the diisocyanate is selected from the group consisting of methyl diphenyl diisocyanate (MDI), toluene diisocyanate (TDI), hexamethylene diisocyanate (HDI), isophorone diisocyanate (IPDI) and combinations thereof;

wherein the natural oils are selected from the group consisting of palm oil, coconut oil, soy oil, jatropa oil, linseed oil, castor oil, rapeseed oil, tallow oil, fish oil and combinations thereof;

wherein the fiberboard is formed by pressing in a mold at a temperature range of 50° C. to 100° C.;

wherein the diisocyanate content is about 15% to less than 25% by weight of the polyurethane oligomers.

10. The fiberboard according to claim 9, wherein the fiberboard is formed by pressing in a mold at a temperature range of 80° C. to 100° C.

11. A method for manufacturing a fibreboard comprising:

mixing dried plant fibers derived from agricultural wastes with binder resins of polyurethane oligomers obtained from a reaction between a diisocyanate and a polyol derived solely from natural oils; and pressing the mixture at a temperature range of 50° C. to 120° C. to form the fibreboard; wherein the diisocyanate content is less than 25% by weight of the polyurethane oligomers.

12. A method according to claim 11 further comprising a step of refining the plant fibres before they are dried.

13. A method according to claim 11, wherein the dried plant fibres are having a moisture content of less than 10% by weight.

14. A method according to claim 11, wherein the dried plant fibres are mixed with the binder resins by mechanical agitation.

15. A method according to claim 11, wherein the diisocyanate is methyl diphenyl diisocyanate (MDI), toluene diisocyanate (TDI), hexamethylene diisocyanate (HDI), isophorone diisocyanate (IPDI) and any combination thereof.

16. A method according to claim 11, wherein the polyol is derived from palm oil, coconut oil, soy oil, jatropa oil, linseed oil, castor oil, rapeseed oil, tallow oil, fish oil or a combination of any two or more thereof.

17. A method according to claim 11 further comprising a step of moulding the fibreboard formed into various shapes.

* * * * *